O. BEST.
AUTOMATIC SELF CLEANING FILTER.
APPLICATION FILED APR. 24, 1916.

1,246,850.

Patented Nov. 20, 1917.
4 SHEETS—SHEET 2.

Inventor
OTTO BEST,

By Watson E. Coleman
Attorney

UNITED STATES PATENT OFFICE.

OTTO BEST, OF SAN FRANCISCO, CALIFORNIA.

AUTOMATIC SELF-CLEANING FILTER.

1,246,850.  Specification of Letters Patent.  Patented Nov. 20, 1917.

Application filed April 24, 1916. Serial No. 93,250.

*To all whom it may concern:*

Be it known that I, OTTO BEST, a citizen of the United States, residing at San Francisco, in the county of San Francisco and State of California, have invented certain new and useful Improvements in Automatic Self-Cleaning Filters, of which the following is a specification, reference being had to the accompanying drawings.

This invention relates to filters for domestic, laboratory and civic use.

One of the most important objects of this invention is the provision of a filter in which the filtering bed may be readily cleaned by a reverse flow of pure filtered water, and in this connection a further object is to so construct the filter that this reverse flow may be secured either by a hydrostatic pressure or by the pressure of air or by the combination of both of these pressures.

Still another object is to provide a filter which is so constructed that this reverse flow of pure filtered liquid through the filter may be caused automatically either at predetermined times or automatically by increase of pressure within the filter due to the clogging of the filter bed, thus permitting the filter to operate continuously with only a minimum of attention.

A further object of the invention is to provide a filter wherein the filtered water or other liquid is kept under constant pressure so that it may be quickly forced out when desired for use or forced back through the filter bed itself for the purpose above stated.

Still another object of the invention is to provide a filter in which the filtered water is kept under constant air pressure, the compressed air acting as a cushion and preventing too rapid changes of pressure and consequent hammering.

Still another object is to provide a filter unit which may be readily combined with other units to any number desired, each unit being of a very simple construction, and in this connection to provide a filter composed of multiple units whereto other units may be added from time to time, or the number of units decreased.

A still further object is to so construct the filter that a back flow of pure filtered liquid may be caused to pass through the filtering bed, and this liquid with the impurities removed from the filtering bed may be carried to a settling tank where the heavy sludge may be removed and the water drawn off to be again filtered so that there is a very slight loss of water and the water is cleared of impurities by a combination of settling and filtration.

Other objects will appear in the course of the following description.

My invention is illustrated in the accompanying drawings, wherein.

Figure 1:
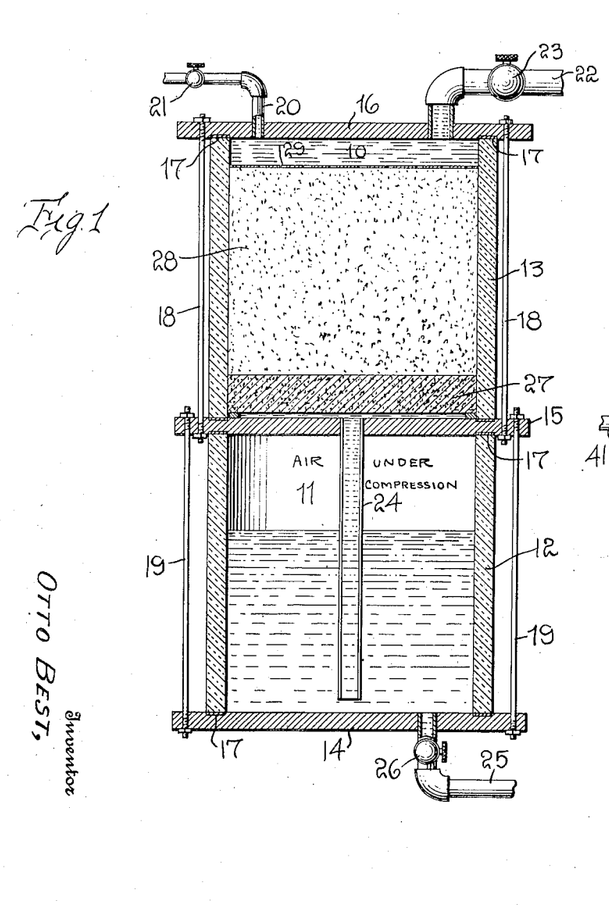
Figure 1 is a vertical sectional view of a filter constructed in accordance with my invention and particularly adapted for domestic use though not necessarily limited to this.

Referring to Fig. 1, which shows one form of my invention, it will be seen that the filter comprises two compartments 10 and 11, the compartment 10, as illustrated, being the filtering compartment and the compartment 11 being designed to contain the filtered liquid. Hereafter in the specification I will refer to this liquid as water, but it is to be understood that this is purely illustrative as the filter may be used for filtering any liquid. The filter is composed of the two cylinders 12 and 13, which may be made of glass or any other suitable material, the casing of the cylinder 12 resting upon the base plate 14 which may be made of brass or other metal, and supporting the intermediate partition plate 15 which may also be made of brass or other suitable metal. The cylinder 13 is supported upon the plate 15 and is covered by a plate 16 of brass or other suitable metal. The joints between the cylinders 12 and 13 and the plates 14, 15 and 16 are made liquid-tight and air-tight by means of gaskets 17, or in any other suitable manner. The plate 16 is drawn toward the plate 15 by means of the tie rods 18 and the plate 15 is drawn toward the plate 14 by means of the tie rods 19. All of these parts may be of any suitable or ordinary construction.

Entering the upper end of the chamber 10, through the plate 16, is a supply or inlet pipe 20 which is relatively small and is provided with a valve 21. This pipe 20 leads from any source of unfiltered water or other liquid. Extending from the top of the chamber 10 is an outlet pipe 22 which is provided for the purpose of drawing off the sludge and also for the purpose of reducing the pressure in the chamber 10, as will more fully appear later. This pipe 22 is provided with a valve 23. The plate 15 is formed with a central opening through which passes a pipe 24 which extends downward to the lower end of the chamber 11. From the chamber 11 extends a discharge pipe for filtered water, designated 25, which is provided with the cock and valve 26.

Disposed within the chamber 10 is any suitable filtering medium or filter bed. This may be in the form of a filter stone or may be composed of sand or any other suitable filtering material, but as illustrated there is a filtering stone designated 27 and a superposed bed 28 of sand or other material, with a filtering plate 29 disposed upon the upper face of the sand. It will be understood that by the term "filtering bed" I intend to cover any layer or combination of layers of filtering material or any wall or partition of filtering material through which the unfiltered water is caused to pass so that its impurities may be eliminated.

In order that the principle of my invention may be thoroughly understood, it is best to describe the operation of this filter before describing the construction and operation of the remaining forms of filter. The unfiltered water is passed into the chamber 10 by means of the pipe 20. Ordinarily this pipe, in domestic filters, will be connected to the city water mains and there will be a pressure of about 50 pounds to the square inch. The pressure of the city water mains and the hydrostatic pressure of the column of water contained within the chamber 10 forces the water downward through the filter bed and downward through the pipe 24 and into the chamber 11 where the water rises as indicated, compressing air in the upper portion of this chamber as clearly indicated in Fig. 1. The amount of compression placed upon the air in the upper portion of the chamber will of course depend upon the pressure of the water in the pipe 20, the pressure of the water in the chamber 10 and the downward pressure due to the height of the column of water in the chamber 10. It will be obvious that the water in the chamber 11 is therefore at all times under pressure. Now if the valve 26 be opened, the water in chamber 11 will be forced outward due to the pressure of the air in the upper portion of the chamber. The flow in this case is rapid even with a comparatively small filtering surface as the liquid is drawn from the storage chamber 11 under pressure and its rate of flow does not depend upon the rate of filtration. When the valve 26 is closed, the lower chamber 11 will again fill up with filtered liquid. If the rate of filtration is too slow, due to the clogging of the filter bed, the valve 23 is opened. This pipe 22 is considerably larger than the inlet pipe 20 and therefore the pressure in the upper compartment is immediately relieved. The pressure in the lower compartment or chamber 11 is now greater than in the chamber 10 and the compressed air forces the clear filtered water back through the pipe 24 and through the filter bed, stirring up the sand or other filtering medium and forcing upward the dirt which clogged up the filter. As the water in the pipe 20 is kept running during this time, the dirt or other foreign matter which is forced out of the filtering bed is carried out and away from the filter through the pipe 22.

Figure 2:
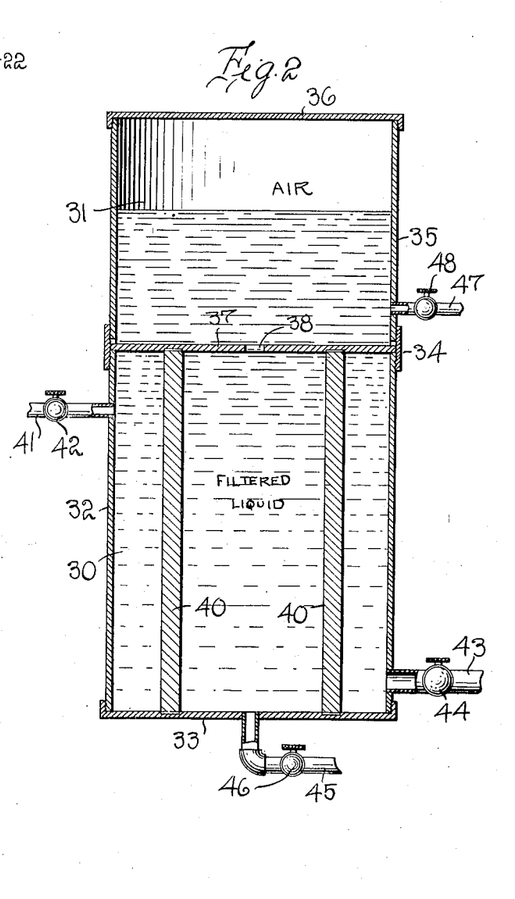
Fig. 2 is a vertical sectional view of another form of filter operating, however, on the same principle as that shown in Fig. 1.

As before remarked, this filter is peculiarly designed for domestic purposes and if this form of filter is used in the household the water used for washing and other ordinary purposes other than drinking can always be drawn from the pipe 22, thus cleaning the filter every time that water is drawn from the pipe 22. Thus it will be seen that this cleaning action is semi-automatic in that it occurs every time that water is drawn for other purposes than drinking. Only the water which is to be used for drinking, cooking, or other purposes where pure filtered water is demanded, is drawn from the pipe 25. Instead of having the filtering medium or bed in the upper compartment, this filtering medium may be placed in the lower compartment, as illustrated in Fig. 2. In this form of filter, 30 designates the lower compartment and 31 the upper compartment or chamber, 32 designating the wall of the lower compartment which is closed at its lower end by the cap 33 and which is connected by a union 34 to the wall 35 of the upper compartment which in turn is closed by a cap 36. An intermediate partition 37 divides the two chambers from each other, this partition being perforated at its center, as at 38.

Disposed between the floor or septum 37 and the cap 33 is a filtering member, hollow and cylindrical in form, comprising a porous cell designated 40. I do not wish to be limited to the particular construction of this cell as it is obvious that many forms of filtering members may be used. Entering the chamber 30 is a supply pipe 41 which is relatively small and provided with a valve or cock 42, while extending from the opposite end of the chamber and from the side wall is the relatively large draw-off pipe 43 provided with a valve 44. Extending from the cap 33 and from the space inclosed by the porous filtering wall 40 is an outlet pipe 45 having a valve 46 and designed for the withdrawal of the filtered liquid. It will be seen that the space inclosed by the porous cell 40 is in communication with the chamber 31 which is designed to form a storage chamber and contain the filtered liquid and compressed air. Extending from the wall 35 is a small air vent pipe 47 controlled by a valve 48, which air vent is used when starting.

The operation of this form of my invention is precisely the same as that heretofore described. The unfiltered water under pressure enters by means of the pipe 41 and filters through the cell 40 into the space inclosed by the cell and then past this into the storage chamber 31 and compresses the air therein. When it is desired to use filtered water, the valve 46 is opened, permitting the water to pass out through the pipe 45. If the rate of flow is too slow, due to clogging of the filtering medium, the valve 44 is opened. The pipe 43 is large relative to the pipe 41 and as a consequence the pressure is greatly reduced. The water on one side of the filtering medium is under a greater pressure than the water on the other side thereof, and as a consequence water is forced out in a reverse direction through the filtering medium and the sludge and other impurities are forced out through the pipe 43. As before remarked, where this filter is used for domestic purposes, water for washing or like purposes may be drawn off by means of the pipe 43 and thus the filter will each time be cleaned by the backward flow of pure, filtered water through the filter bed or other filtering medium.

What is particularly characteristic of the filter as heretofore described, and what indeed is characteristic of all the filters constructed in accordance with my invention, is that pure or filtered water or other liquid is automatically caused to flow backward or reversely through the filtering bed which loosens the dirt on the clogged up side of the filtering medium or bed without, however, clogging up the opposite side which is the case where unfiltered water is allowed to flow first on one side of the filter bed and then on the other. It will further be noted that the filtered water used for drinking purposes is never at any time contaminated as would be the case were the water simply reversed in its flow through the filter and would for a space carry out into the outlet pipe the mud, sediment and other contamination present in the filtering bed itself.

Furthermore, the additional flow of water which passes into the chambers 10 or 30 by the inlet pipes 20 or 41 helps wash away the dirt or foreign matter which is loosened by the reverse flow of the water, thus cleaning out from the unfiltered water side of the filter bed all the loosened dirt and particles which have been detached from the filter bed. Again, it will be seen that in both forms of filters heretofore described, one compartment serves as a storage chamber for filtered water so that the flow of water from the outlet pipes 25 or 45 is independent of the rate of filtration. Furthermore, in both examples of my invention heretofore described, the compressed air acts as a cushion and prevents too rapid changes in pressure and prevents hammering, which hammering is destructive of the apparatus itself and prevents proper filtration.

While I have heretofore described what may be termed a semi-automatic filter or one in which the backward or reverse flow of the liquid is secured every time that the discharge pipes 22 or 43 are opened to draw off unfiltered water, yet it is obvious that this cleansing of the filter may be made absolutely automatic in its action and may occur at predetermined intervals. Thus the valve 23 or the valve 44 may be operatively connected to mechanism acting to open the valve after a predetermined number of strokes of a pump or the valve, or a diaphragm valve may be attached to the compartment of the filter composing a filtering medium, this diaphragm valve being operatively connected to the draw-off valve 23 or 44 as the case may be, so that when the pressure within the unfiltered liquid compartment becomes too great due to clogging up of the filter bed, the draw-off valves will be caused to open and the filter will be cleaned, or the draw-off valve may be attached to clock work and opened at certain intervals. Certain specific mechanisms for this purpose will be described hereafter.

Figures 3, 6:
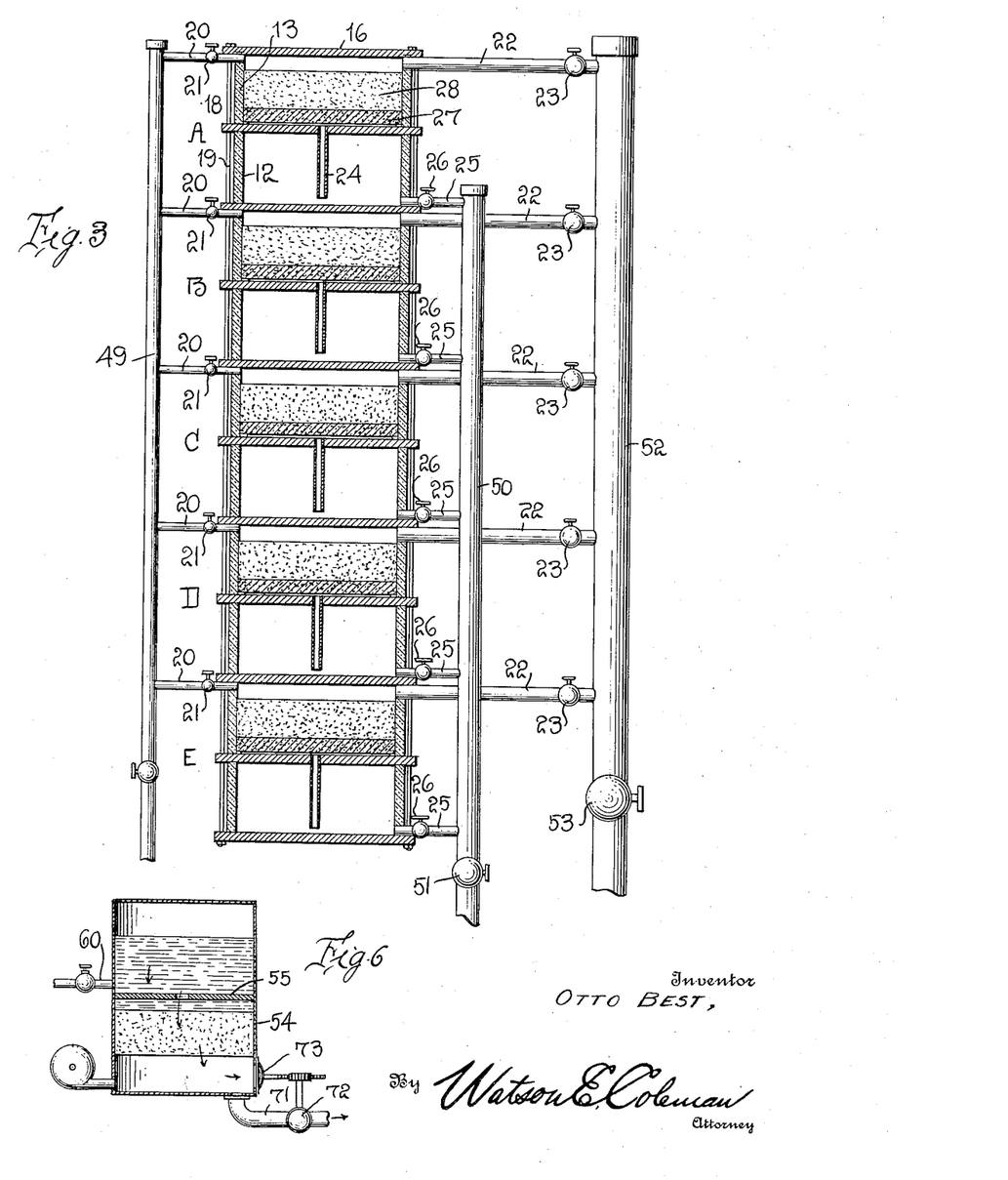
Fig. 3 is a vertical sectional view of a "multiple unit" filter, each unit being constructed in accordance with the form of the filter illustrated in Fig. 1.
Fig. 6 is a sectional view of a filter, showing a diaphragm operated valve controlling means applied thereto.

It is to be noted that either form of filter illustrated in Figs. 1 and 2 is very simple and that it constitutes a filtering unit which may be combined with other filtering units so as to thus increase the capacity of the filter. Such a filter made up of a plurality of units I designate a multiple unit filter and this is illustrated in Fig. 3. In this drawing the units which are designated A, B, C, D and E have exactly the same form as the filter illustrated in Fig. 1 and therefore like reference numerals to those in Fig. 1 have been used to designate the several parts of each unit. All of the inlet pipes 20 of the several units are connected to a common supply pipe, designated 49, and thus connected with one source of unfiltered water or other liquid. This source may be a pump, a pressure tank, a high standing reservoir or the like. From this pipe the unfiltered water leaves each unit through the outlet pipe 25, these several outlet pipes being connected to a common outlet pipe 50 provided with a valve 51.

From the space above the filter bed of each unit extends the pipe 22 and these several pipes 22 are all connected to a common sludge discharge pipe 52 provided with the valve 53. It will be noted that each of the inlet pipes 20 is provided with the valve 21, while each of the outlet pipes 25 is provided with a valve 26 and that each sludge discharge pipe 22 is also provided with a valve 23. The unfiltered water enters each unit through the pipe 20 and is drawn off through the pipe 25 in the manner heretofore described and is discharged through the single pipe 50. The water used for cleaning the filter in the manner heretofore described passes off through the several pipes 22 and discharges into the common pipe 52. For general cleaning purposes, where all of the units are to be cleaned, the valves 23 are all opened and the valve 53 opened, whereupon the pressure above the filter bed will be reduced in each unit and the back pressure of the air trapped in the upper portion of each chamber 11 will force the pure filtered water back through the filter bed and out through the pipes 22 and the pipe 52. By providing the valves 21, 23 and 26, any one unit can be cut out of operation or cut into operation without disturbing the other units. It will further be obvious that at any time it is readily possible to add more units by simply increasing the lengths of pipes 49 and 52 and that at any time it is possible to decrease the number of units. This makes the filter very elastic. It will further be obvious that the capacity of the filter may be increased almost indefinitely by adding more units, and that the filter need not be made unnecessarily heavy and that it will need but little floor space. Furthermore, it is obvious that any one of the filter beds may be readily cleaned without cleaning or in any way affecting the operation of the other filter beds. Thus some of the units may be providing filtered water while other units are being cleaned, and thus there will always be some units in which the beds are free from dirt and which can supply filtered water at all times.

The basic principle of this invention as illustrated in Figs. 1, 2 and 3, it will be seen, is that the filtered water in the chamber 11, for instance, in Fig. 1, or the chamber 31 in Fig. 2, at all times stands under pressure, and that as soon as the pressure on the opposite side of the filter bed is relieved the clean filtered water or other liquid in the chamber will be forced reversely through the filtering bed, thus loosening the dirt from the filter and removing it or removing it without aid of the inflowing unfiltered water. Now in the constructions shown in Figs. 1 and 2, this pressure in the filtered water compartment is secured by the pressure of the city water main to which the filter is attached, or the pressure might be secured by a pump or by having the water flowing into the filter from a high tank. The filtration of the water or the inflow of water into the filter is intermittent in these constructions for the reason that as soon as the valve 26 in Fig. 1 or the valve 46 in Fig. 2 is closed, filtration will keep up just so long as the pressure on the inlet side of the filter bed is greater than the pressure on the storage side of the filter bed, allowance being duly made for friction of water passing through the filter. As the pressure in the city main averages about 50 pounds, this pressure would be the ultimate pressure under which the filtered water would be kept and would be practically the pressure of the compressed air and thus the backward flow of pure water through the filter due to the opening of the valves 23 or 44 would be under practically the same pressure. It is obvious that while I have illustrated the space for the compression of air as being located at the upper end of the chamber containing the filtered water, yet this air chamber might be a separate compartment simply connected to the chamber for containing the filtered water and yet the operation be precisely the same. Furthermore, while I have heretofore illustrated and described the pressure on the filtered water as being secured by an air cushion, yet this pressure exerted by the compressed air could be replaced by hydrostatic back pressure and the principle and result would be practically the same. This is particularly desirable in industrial filters where a continuous flow or filtration is desired, and in that case provision must be made for securing a practically continuous back pressure upon the water in the filtered water chamber.

Figure 4:
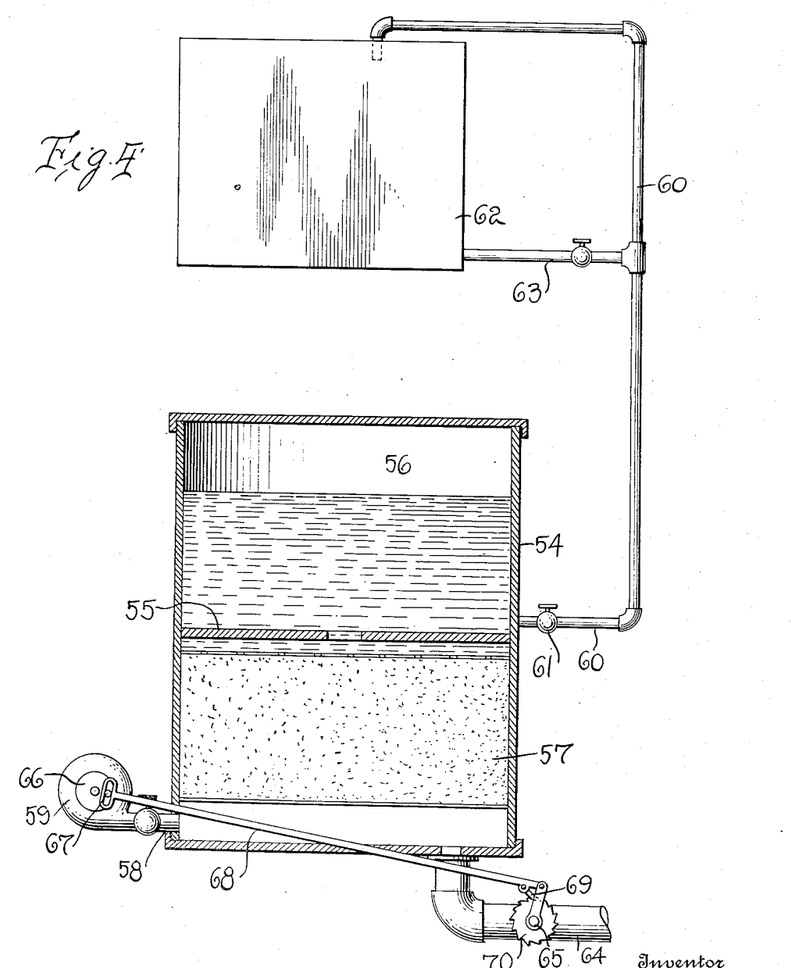
Fig. 4 illustrates a modified form of filter used in connection with a storage tank whereby hydrostatic pressure may be secured upon the filtered liquid.

In Fig. 4 I show an arrangement in which this back pressure is secured not only by compressed air but by hydrostatic pressure and in this figure 54 designates a filter casing divided by a partition 55 into a filtered water chamber 56 and a filtration chamber 57 having therein a filtration bed of any suitable character. Into the chamber 57 extends an inlet pipe 58 which is connected to a pump 59 drawing water from any suitable source and forcing it under pressure into the chamber 57 below the filtration bed. From the lower end of the chamber 56 extends a pipe 60 having a valve 61, this pipe extending upward into a storage tank 62. This pipe 60 is shown as discharging into the upper end of the storage tank 62 but the pipe 60 is connected by means of a pipe 63 to the lower end of the storage tank.

From the chamber 57 and from the space below the filter bed extends a sludge discharge pipe 64 which is of course considerably larger in diameter than the inlet pipe 58 and than the pipe 60, this pipe 64 being provided with a valve 65. Now it will be obvious that if the filter bed becomes clogged and it is desired to clean the filter bed it is only necessary to open the valve 65 whereupon the pressure below the filter bed is greatly reduced and the filtered water in the chamber 56 is forced back through the filter bed, not only by the compressed air in the chamber 56 but by the hydrostatic pressure of the water in the pipe 60 and the pressure of water in the tank 62 exerted through the pipe 63. It is obvious that in this case the compressed air is incidental and that sufficient pressure may be secured entirely from the hydrostatic pressure of the water in the column 60 in the storage tank. This arrangement illustrated in Fig. 4 is to be used in places where the water has to be pumped to a height and thus it will be seen that the back pressure is created by the process of pumping or from the actual act of pumping, if the filter is placed on the level of the pump, or at least much lower than the height of the receiving vessel or reservoir. The water that is pumped from a stream, creek, river, or other source, has to be pumped anyway, and with my construction it is at the same time filtered. With this construction, it is possible, however, to keep the filter clean by merely opening the valve 65 and as through the frequent self-cleaning the rate of filtration is kept very high, the filtering surface and filter can be comparatively small.

For purposes of illustration I have shown means connected to the pump whereby the valve 65 may be opened after a predetermined number of revolutions of the pump. This means is of course meant to be merely illustrative of the fact that the valve 65 (or the valves 23 or 44 or 53) in the several forms of construction heretofore described may be operated by mechanical means and operated intermittently. For the purpose of illustration I have shown a centrifugal pump 59 and its shaft as being provided with a wheel 66 formed with a pin 67 operating on a link 68 which in turn carries a pawl 69 operating on a ratchet wheel 70, this ratchet wheel being in turn connected with a sludge valve 65 so that as the pump rotates the ratchet wheel will be given a step by step movement and at a certain point in its rotation the valve 65 will be opened, remaining open for a predetermined time and then again closed. As illustrated, the valve 65 is given a continuous rotation in one direction and will open twice in the course of this rotation. It is obvious, however, that a large number of other mechanisms may be used for this purpose.

In Fig. 6 I show a construction wherein the filtering tank is provided with a draw-off pipe 71 having therein the valve 72 which is a draw-off or a sludge valve, the wall of the filtering tank 54 being provided with a diaphragm 73 controlled by pressure from the inlet side of the filtering bed, which diaphragm, if the pressure increases beyond a predetermined amount due to clogging of the filter pad, will be forced outward against the resilience of the diaphragm or like means, and this outward movement of the diaphragm will, through the proper connections, open the valve 72. This construction, whenever the pressure on the inlet side of the filter bed increases beyond a predetermined amount due to the clogging of the filter bed, the draw-off pipe 71 will be opened and the filtered water will be forced reversely through the filter bed to cleanse it.

Figure 5:
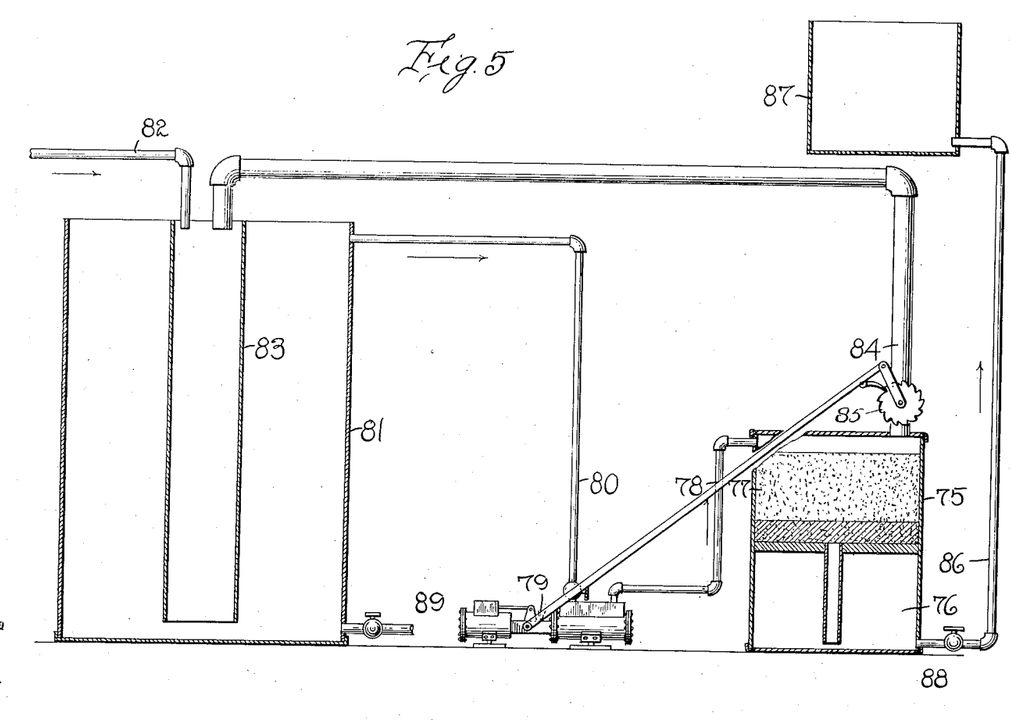
Fig. 5 is a diagrammatic view illustrating the combination of one of my improved filters with a settling tank and pump.

In Fig. 5 I show an arrangement of my filter in connection with a settling tank, the arrangement being such as to minimize or entirely reduce any waste of water in cleansing the filter bed. In this figure, 75 designates the filter which is constructed in the same manner as shown in Fig. 1, with a lower filtered water chamber 76 and an upper filtration chamber 77 having a filter bed therein. The inlet pipe 78 for the unfiltered water leads from a pump 79 of any suitable construction, and the inlet pipe 80 for this pump extends from the upper end of a settling tank 81 into which water is discharged by means of a pipe 82 leading from any source of water supply. Preferably the pipe 82 discharges into a vertically disposed chamber 83 which is open at its lower end, the lower end being disposed, however, at approximately the bottom of the tank 81. From the filtration tank 75 extends the draw-off pipe or cleaning pipe 84 which is provided with a valve 85, this pipe 84 being of course of considerably larger diameter than the inlet pipe 78. This cleaning pipe 84 extends to the settling tank 81 and preferably discharges into the cylindrical member 83.

From the chamber 76 for the filtered water extends a discharge pipe 86 which leads to a storage tank 87 for the filtered water, this pipe 86 being provided with a valve 88. From the tank 81 extends a discharge pipe 89 whereby heavy sludge may be discharged from the tank 81. It is to be understood of course that the filter operates in exactly the same way as heretofore described. Now it is obvious that if the filter becomes clogged and it is desired to clean it, the valve 83 is opened and the filtered water is forced backward through the filtering bed by the hydrostatic pressure of the water in the pipe 86 and by the compressed air in the upper portion of the chamber 76. Clean filtered water, therefore, together with the water issuing from the inlet pipe 78 passes upward through the pipe 84 and is discharged into the tank 81 so that the sludge and other impurities which have been taken from the water by the filter bed or which have been taken from the filter bed by the reverse current of water flowing from the chamber 76, are discharged into the tank 81 and settle to the bottom thereof and relatively clean water is taken from the upper portion of the tank 81 by means of the pipe 80. This water has been settled but not filtered. The cylindrical member 83 serves to prevent any disturbance of water in tank 81 and so that the particles of foreign matter in the water will gradually settle down into the bottom of the tank and this heavy sludge may be drawn off through the pipe 89. Thus all water passing to the filter is first settled and the relatively clean water taken off to the pump, and second, all of the water which has become contaminated being passed reversely through the filter to clean it is again passed to the settling tank and the impurities settled. Thus I secure a purification of the water by both filtration and by settling, and thus the loss of cleaning water is greatly reduced or almost entirely eliminated.

It will be seen that I have provided, therefore, in all of the forms of my apparatus illustrated a self-cleaning filter which operates to clean the filter bed by back pressure of the filtered water, this back pressure being caused either by compressed air, by hydrostatic pressure, or any other suitable means. Furthermore, I have provided in certain forms of my apparatus for automatic and continuous self-cleaning. Again, I have provided a filter unit which may be aggregated with other filtering units to provide a multiple unit filter having great elasticity and in which any one of the units may be cut out or on or any one of the units used as desired, and finally, I have provided means whereby the cleansing and purification of water may be secured by a combination of settling and filtration.

While I have illustrated merely the essential features of my various filtering constructions and have illustrated these to a large extent diagrammatically, it will of course be understood that many changes might be made in the arrangement of the filtering chambers, pipes, etc., and in the construction of the various parts without departing from the spirit of the invention.

Having described my invention, what I claim is:

1. In a filter, a filtering chamber having an inlet, a filtering medium in the chamber, a storage chamber communicating near the bottom thereof with the filtering chamber, means for forcing liquid under pressure by way of said inlet into and through the filtering chamber, through the filtering medium and into the storage chamber, whereby air may be compressed within the storage chamber to thereby exert back pressure on the liquid in the storage chamber normally less than the pressure of the liquid in the filtering chamber, an outlet from the filtering chamber larger in area than the area of the inlet, means for opening the outlet from the filtering chamber to thereby reduce the pressure in the filtering chamber to less than that in the storage chamber to thereby cause the reverse movement of the liquid from the storage chamber into the filtering chamber and through said outlet, and thereby cleanse the filter.

2. In a filter, a filtering chamber having a relatively small inlet at its upper end, a partition extending across the chamber and dividing it into two compartments, the lowermost compartment constituting a storage chamber, a filtering bed resting upon said partition and disposed in the uppermost compartment, a pipe extending downward from the partition into the lower end of the storage chamber and at its upper end communicating with the filtering chamber below the filtering bed, a relatively large discharge pipe extending from the upper compartment, and a relatively small discharge pipe extending from the lower compartment, both of said discharge pipes having valves whereby discharge therefrom may be controlled.

3. In a filter, a filtering chamber, a storage chamber in communication near its lower end therewith, a filtering medium in the filter chamber through which liquid passes into the storage chamber, means including a pump for forcing liquid into and through the chamber at a predetermined pressure, thereby exerting back pressure upon the liquid in the storage chamber, said back pressure being normally less than the pressure of the liquid in the filtering chamber, a settling tank, a pipe connecting the upper end of the settling tank with the pump, and a discharge pipe connected to the filtering chamber on the same side of the filtering medium as the inlet pipe, said discharge pipe being of greater area than the inlet pipe and discharging into the settling tank, and means for controlling the passage of liquid through the discharge pipe.

4. In a filter, a filtering chamber, a storage chamber in communication near its lower end therewith, a filtering medium in the filter chamber through which liquid passes into the storage chamber, means including a pump for forcing liquid into the filtering chamber at a predetermined pressure, thereby exerting back pressure upon the liquid in the storage chamber, said back pressure being normally less than the pressure of the liquid in the filtering chamber, said means including a pipe extending upward to a point above the storage tank and exerting a hydrostatic pressure upon the liquid in the storage tank, a settling tank, a pipe connecting the upper end of the settling tank with the pump, and a discharge pipe connected to the filtering chamber on the same side of the filtering medium as the inlet pipe, said discharge pipe being of greater area than the inlet pipe and discharging into the settling tank, and means for controlling the passage of liquid through the discharge pipe.

5. In a filter, a filtering chamber having an inlet, a filtering medium in the chamber, and a storage chamber communicating near the bottom thereof with the filtering chamber, means for forcing liquid under pressure by way of said inlet into and through the filtering chamber and the filtering medium and then into the storage chamber, thereby exerting back pressure on the liquid in the storage chamber normally less than the pressure of the liquid in the filtering chamber, and means whereby an outlet may be opened from the filtering chamber larger relatively than the inlet thereto to thereby reduce pressure within the filtering chamber to less than that in the storage chamber whereby the back pressure in the storage chamber will force liquid back through the filtering chamber and the filtering medium to thereby cleanse the latter.

6. In a filter, a filtering chamber having an inlet, a filtering medium in the chamber, a storage chamber communicating near the bottom thereof with the filtering chamber, means for forcing liquid under pressure by way of said inlet into and through the filtering chamber, through the filtering medium and into the storage chamber, thereby exerting back pressure on the liquid in the storage chamber normally less than the pressure of the liquid in the filtering chamber, an outlet from the filtering chamber larger in area than the area of the inlet, and means for automatically opening the outlet from the filtering chamber at predetermined intervals to thereby reduce the pressure in the filtering chamber to less than that in the storage chamber to thereby cause the reverse movement of the liquid from the storage chamber into the filtering chamber and through said outlet and thereby cleanse the filter.

In testimony whereof I hereunto affix my signature in the presence of two witnesses.

OTTO BEST.

Witnesses:
LYDIA F. HURLBERT,
FRANK A. WEGNER.